(12) United States Patent
Wang

(10) Patent No.: US 10,926,335 B2
(45) Date of Patent: Feb. 23, 2021

(54) NANO-METAL PARTICLES AND PREPARATION PROCESS THEREOF

(71) Applicant: Dong Wang, Weinan (CN)

(72) Inventor: Dong Wang, Weinan (CN)

(73) Assignee: Dong Wang, Weinan (CN)

( * ) Notice: Subject to any disclaimer, the term of this patent is extended or adjusted under 35 U.S.C. 154(b) by 463 days.

(21) Appl. No.: 15/740,173

(22) PCT Filed: Jun. 30, 2016

(86) PCT No.: PCT/CN2016/087922
§ 371 (c)(1),
(2) Date: Dec. 27, 2017

(87) PCT Pub. No.: WO2017/005132
PCT Pub. Date: Jan. 12, 2017

(65) Prior Publication Data
US 2018/0185926 A1    Jul. 5, 2018

(30) Foreign Application Priority Data

Jul. 3, 2015  (CN) .......................... 201510386772.8

(51) Int. Cl.
*B22F 9/24* (2006.01)
*B22F 1/00* (2006.01)
(Continued)

(52) U.S. Cl.
CPC .............. *B22F 9/24* (2013.01); *B22F 1/0018* (2013.01); *B22F 9/026* (2013.01);
(Continued)

(58) Field of Classification Search
None
See application file for complete search history.

(56) References Cited

U.S. PATENT DOCUMENTS

| 2008/0034921 A1* | 2/2008 | Vanheusden | ........ B22F 1/0022 |
| | | | 75/362 |
| 2009/0196788 A1* | 8/2009 | Wang | ..................... C30B 29/02 |
| | | | 420/501 |

(Continued)

FOREIGN PATENT DOCUMENTS

| CN | 101104205 A | 1/2008 |
| CN | 101610865 A | 12/2009 |

(Continued)

OTHER PUBLICATIONS

PCT International Search Report for PCT/CN2016/087922, dated Sep. 1, 2016, 16 pages.

(Continued)

*Primary Examiner* — George Wyszomierski
(74) *Attorney, Agent, or Firm* — Law Offices of Liaoteng Wang

(57) ABSTRACT

The present invention relates to a nano-metal particles and a preparation process thereof. Specifically, the nano-metal particles are prepared by a process comprising the steps of: a) providing a solution of a metal precursor; b) providing a mother liquor comprising a reducing agent; c) atomizing the solution of the metal precursor; and d) allowing the metal precursor to react with a reducing agent to form the nano-metal particles, wherein the metal precursor has a higher solubility in the first solvent than in the mother liquor. The present process for preparing nano-metal particles not only has the advantages of the traditional liquid phase chemical (Continued)

reduction process such as simple equipment, easy availability of raw materials, low cost, easy control of conditions, high yield, large output and the like, but also may produce the nano-metal particles having a very desirable particle size and particle size distribution.

17 Claims, 3 Drawing Sheets

(51) Int. Cl.
B82Y 30/00 (2011.01)
B82Y 40/00 (2011.01)
B22F 9/02 (2006.01)

(52) U.S. Cl.
CPC ........... *B22F 2999/00* (2013.01); *B82Y 30/00* (2013.01); *B82Y 40/00* (2013.01)

(56) References Cited

U.S. PATENT DOCUMENTS

| 2013/0087363 A1* | 4/2013 | Oh | C22C 19/03 |
| | | | 174/126.1 |
| 2014/0087058 A1 | 3/2014 | Meth | |
| 2015/0107412 A1* | 4/2015 | Lee | B22F 9/06 |
| | | | 75/355 |
| 2016/0082513 A1* | 3/2016 | Niedermeyer | B22F 9/04 |
| | | | 424/405 |

FOREIGN PATENT DOCUMENTS

| CN | 101758230 A | 6/2010 |
| CN | 101903111 A | 12/2010 |
| CN | 102009182 A | 4/2011 |
| CN | 102245331 A | 11/2011 |
| CN | 103658674 A | 3/2014 |
| CN | 203751337 U | 8/2014 |
| CN | 104014804 A | 9/2014 |
| CN | 104014805 A | 9/2014 |
| CN | 104259455 A | 1/2015 |
| CN | 104607651 A | 5/2015 |
| JP | 2014240523 A | 12/2014 |
| JP | 2015034347 A | 2/2015 |
| WO | 2012173262 A1 | 12/2012 |

OTHER PUBLICATIONS

First Office Action dated Oct. 9, 2017 and first Search Report in Chinese Patent Application No. 201510386772.8, and concise English-language summary thereof, 10 pages.

* cited by examiner

NANO-METAL PARTICLES AND PREPARATION PROCESS THEREOF

CROSS-REFERENCE TO RELATED APPLICATION

This application is based on and claims priority to Chinese Patent Application No. 201510386772.8 filed on Jul. 3, 2015, which is incorporated herein by reference in its entirety.

TECHNICAL FIELD

The present invention relates to nano-metal particles, in particular to nano-metal particles having a narrow particle size distribution. The invention also relates to a method of preparing such nano-metal particles.

BACKGROUND

At present, research on nano-materials is very active. As an important type of nano-materials, nano-metal particles show different thermal, optical, electrical, magnetic and catalytic properties from large-size materials due to their small size effect, surface effect, quantum size effect and macroscopic quantum tunneling effect, which have a wide range of applications in the field of superconductivity, microelectronics, biology, and catalysis. Generally, nano-metal particles refer to metal particles having a particle size (i.e., diameter or equivalent diameter) of between 1 and 1000 nm. In addition to the particle size, particle size distribution width is also an important parameter to characterize the nano-metal particles.

With the continuous development, the preparation process of nano-metal particles are various, such as a chemical reduction method, a photochemical method, a microemulsion method, a template method, a phase transfer method, an ultrasonic method, a radiation and so on. Among these methods, a process for the preparation of nano-metal particles by reducing a metal precursor solution with a reducing agent (also referred to as a liquid phase chemical reduction method) at a liquid phase condition is a process of high application value. The process has the advantages of simple equipment, easy availability of raw materials, low cost, easy control of conditions, high yield and large output, and is particularly suitable for industrial scales and has a good industrialization prospect. However, this process still has the problem of uneven reaction and insufficient reaction. So, the particle size and the particle size distribution of the metal particles prepared therefrom are not ideal, and thus there is still a desire for further improvement.

SUMMARY

In view of the above, the present invention provides a process for preparing nano-metal particles based on a liquid-phase chemical reduction method. This process allows the preparation of nano-particles having a narrow particle size distribution, such as a particle size distribution width of below 0.1 and a particle size, such as less than about 20 nm, preferably between 1 nm and 10 nm in a simple, fast way. The present invention also provides thus obtained nano-metal particles.

In one aspect, the present invention provides a process for preparing nano-metal particles, the process comprising the steps of: a) providing a solution of a metallic precursor in a first solvent at a first temperature; b) providing a solution of a reducing agent in a second solvent containing a polymeric protective agent at a second temperature as a mother liquor; c) atomizing the solution of the metallic precursor and contacting the atomized metallic precursor solution with the mother liquor; and d) allowing the metallic precursor to react with the reducing agent to form the nano-metal particles, wherein the metal precursor has a higher solubility in the first solvent at the first temperature than in the mother liquor at the second temperature. Preferably, the process further comprises, stirring the resulting mixed solution while contacting the atomized metal precursor solution with the mother liquor.

The above-mentioned process of the present invention not only has the advantages of the liquid-phase chemical reduction method itself, but also produce nano-metal particles having ideal particle size and particle size distribution width compared to those prepared by the traditional liquid-phase chemical reduction method. Specifically, the nano-metal particles prepared by the process of the present invention described above have a particle size of less than or equal to 20 nm and a particle size distribution width of less than or equal to 0.1, the particle size as measured by Dynamic Light Scattering (DLS) or Transmission Electron Microscopy statistical analysis and the particle size distribution width as determined by DLS or transmission electron microscopy image statistical analysis.

In another aspect, the present invention provides nano-metal particles having a particle size of less than or equal to 20 nm and a particle size distribution width of less than or equal to 0.1, the particle size as measured by Dynamic Light Scattering (DLS) or Transmission Electron Microscopy statistical analysis and the particle size distribution width as determined by DLS or transmission electron microscopy image statistical analysis.

As is known, in the liquid chemical reduction method, the formation of nano-metal particles includes two steps of nucleation and crystal growth. Specifically, a metal precursor reacts with a reducing agent in the liquid phase to form an elemental metal. The resulting elemental metal is insoluble or poorly soluble in the liquid phase and thus liquid-solid phase transformation occurs. Liquid-solid phase transformation firstly comprises the nucleation step, i.e. the elemental metal in the state of super-saturation in the liquid phase overcomes the surface energy barrier and forms nuclei. After the formation of a stable nucleus, the newly generated elemental metal adsorbs to the nuclei surface and accumulates according to the lattice structure of the crystal so that the metal crystal particles grow. Obviously, the size of the finally obtained nano-metal particles is related to the crystal growth time and the crystal growth rate of the metal particles. It is known that at a given temperature, the growth rate of the metal crystal depends mainly on the concentration of the metal element, which in turn depends on the production rate of the metal element. The inventors realized that if multiple nano-metal particles undergo substantially the same crystal growth time and crystal growth rate during the formation of the nano-metal particles, the resulting nano-metal particles will have a uniform particle size with a narrow particle size distribution. Conversely, if the nano-metal particles undergo different crystal growth times and/or crystal growth rates, the resulting nano-metal particles will have a non-uniform particle size with a broad particle size distribution.

In the conventional liquid chemical reduction method, a solution of a metal precursor is added dropwise to a mother liquor containing a reducing agent and reacts with the mother liquor immediately after being mixed with it, thereby forming a metal element. As a result, the elemental metal as formed undergo nucleation and crystal growth. In other words, as the metal precursor solution is continuously dropped into the mother liquor, the process of liquid chemical reduction including metal elemental nucleation and crystal growth is also ongoing. Throughout the system, metal nucleation and crystal growth in different regions begin at different times. In addition, the reducing agent contained in the mother liquor is continuously consumed, and its concentration changes with time. At the beginning of the preparation process, the concentration of the reducing agent molecule in the mother liquor is higher, and the rate of formation of the metal elemental molecules is higher. As the preparation proceeds, the metal precursor solution is continuously added, and the reducing agent molecules in the mother liquor are continuously consumed. At the latter stage of the preparation process, the concentration of the reducing agent molecules in the mother liquid decreases, and the rate of formation of the metal elemental molecules decreases. As a result, the rate of crystal growth at this stage is also lower. In other words, during the preparation of such metal nanoparticles, the generated nano-metal particles are different in the terms of crystal growth time and/or crystal growth rate, and thus the resulting nano-metal particles have a broad size distribution.

The present invention provides an improvement over the conventional liquid phase chemical reduction method. Specifically, in the present process, a solution of a metal precursor is atomized and contacts with a mother liquor containing a reducing agent in an atomized form; furthermore, the metal precursor has a higher solubility in the solvent for formulating the metal precursor solution than in the mother liquor in which the reduction reaction occurs. Unexpectedly, the process of the present invention makes it possible to obtain nano-sized metal particles having a desired particle size and a very narrow particle size distribution width compared with the conventional liquid phase chemical reduction method. Without wishing to be bound by theory, the inventor provides the following explanation in order that the present invention may be better understood.

In the preparation process of the present invention, a solution of the metal precursor is added to the mother liquor by atomization, and since the metal precursor has a higher solubility in the solvent for formulating the metal precursor solution than in the mother liquor in which the reduction reaction occurs, a large amount of solid crystallites of the metal precursor are precipitated in the mother liquid due to decreased solubility when the metal precursor solution is brought into contact with the mother liquor. The resulting solid crystallites cannot react with the reducing agent in the mother liquid immediately due to a phase difference even if they come into contact with each other. The isolated metal precursor crystallites can be quickly and fully dispersed into the mother liquor, and a dynamic solid—liquid phase change process is established via dissolution and precipitation. Prior to this dynamic phase change process, the concentration of the reducing agent in the mother liquor is not or essentially not consumed and the concentration remains essentially unchanged due to the very little reaction with the solid metal precursor crystallites. In the phase that the isolated metal precursor crystallites are quickly and fully dispersed into the mother liquor, and a dynamic solid—liquid phase change process via dissolution and precipitation is established, the dissolved metal precursor reacts with the reducing agent in the liquid phase, and the generated metal element undergoes nucleation and crystal growth process, thereby precipitating the nano-metal particles. In the process of the present invention, the nucleation of the nano-metal particles grown at different regions of the liquid phase reaction system occurs at the substantially same time; during the growth phase, different crystal particles has the substantially same growth rate at the same time since the metal element has the substantially same production rate throughout the liquid phase reaction system because of the substantially same concentration of the reducing agent. Since the nano-metal particles prepared by the process of the present invention have substantially the same nucleation time and the crystal growth rate as each other, it is possible to provide the nano-metal particles having a desired particle size while having a very narrow particle size distribution width. It is particularly advantageous, according to the present invention, to provide substantially monodispersed nano-metal particles.

In addition, the inventors of the present invention have surprisingly found that the nano-metal particles obtained by the process of the present invention have excellent bioavailability. For example, the obtained nano-silver particles have excellent antibacterial effect.

Definition

When the content of the present invention is described, the use of "a", "an", "the", "at least one", and "one or more" (especially in the context of the claims) should be construed to cover both the singular and the plural, unless otherwise indicated or contradicted by context.

Throughout the present disclosure, where processes are described as having, including, or comprising specific process steps, it is contemplated that the processes as disclosed herein may further comprise other components or fractions or steps, whether or not, specifically mentioned in this disclosure, as along as such steps do not affect the basic and novel characteristics of the invention, but it is also contemplated that the compositions or processes may consist essentially of, or consist of, the recited components or steps.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, within a range includes every point or individual value between its end points even though not explicitly recited. Thus, every point or individual value may serve as its own lower or upper limit combined with any other point or individual value or any other lower or upper limit, to recite a range not explicitly recited.

In the context of the present invention, the term "solubility" refers to the ability of solute to be dissolved in a particular solvent at a certain temperature. For example, solubility can be expressed as grams dissolved at a temperature at which solute saturates in 100 grams of solvent. In this context, solubility is a function of temperature. Normally, as the temperature increases, solute's solubility increases; and as the temperature decreases, solute's solubility decreases.

In the context of the present invention, the term "metal precursor" refers to a metal ion compound capable of obtaining a target metal via a reduction step by liquid phase chemical reduction. For example, for the preparation of metallic silver, if silver nitrate ($Ag(NO_3)$) is used as a starting material, it is formulated into a solution and then is reduced to the metallic Ag using the liquid phase chemical reduction method, then the starting material silver nitrate is considered a metal precursor. If silver hydroxide Ag(OH) is used as a starting material followed by reacting with nitric acid to form silver nitrate and then the formed silver nitrate is reduced to metal Ag by liquid phase chemical reduction, the intermediate silver nitrate is still considered as a metal precursor.

In the context of the present invention, the term "metal precursor crystallite" refers to a metal precursor present in the form of a solid in a microscopic dimension (i.e. visually invisible dimension). The particle size of the metal precursor crystallites can be characterized qualitatively by dynamic light scattering DLS or transmission electron microscopy image analysis. In one embodiment of the present invention, the particle size of the metal precursor crystallites is characterized by the following process. First, the atomized metal precursor comes into contact with a mother liquor containing a reducing agent. Upon contacting, visible macroscopic substance is formed in the reaction system. At this point, the substance is removed from the reaction system and lyophilized. The lyophilized solid thus formed is then dispersed into a suitable solvent such as chloroform and characterized qualitatively using dynamic light scattering or transmission electron microscopy image analysis.

When used in the context of metal precursors, the term "standard electrode potential" is a measure of the oxidizability of metal ions in the metal precursors. The higher the standard electrode potential, the stronger the oxidation of metal ions is. Depending on the standard electrode potential of the target metal, a suitable reducing agent can be selected so that the metal precursor can be reduced to elemental metal by the liquid phase chemical reduction reaction.

In the present invention, the prefixes of solvents such as "first" and "second" do not have any limiting meaning and are merely used for the purpose of distinction.

The terms "preferred" and "preferably" refer to embodiments of the present invention that may provide certain benefits in certain circumstances. However, other embodiments may also be preferred in the same or other circumstances. In addition, the recitation of one or more preferred embodiments does not imply that other embodiments are not useful, and is not intended to exclude other embodiments from the scope of the present invention.

DRAWINGS

DETAILED DESCRIPTION

Figure 1:
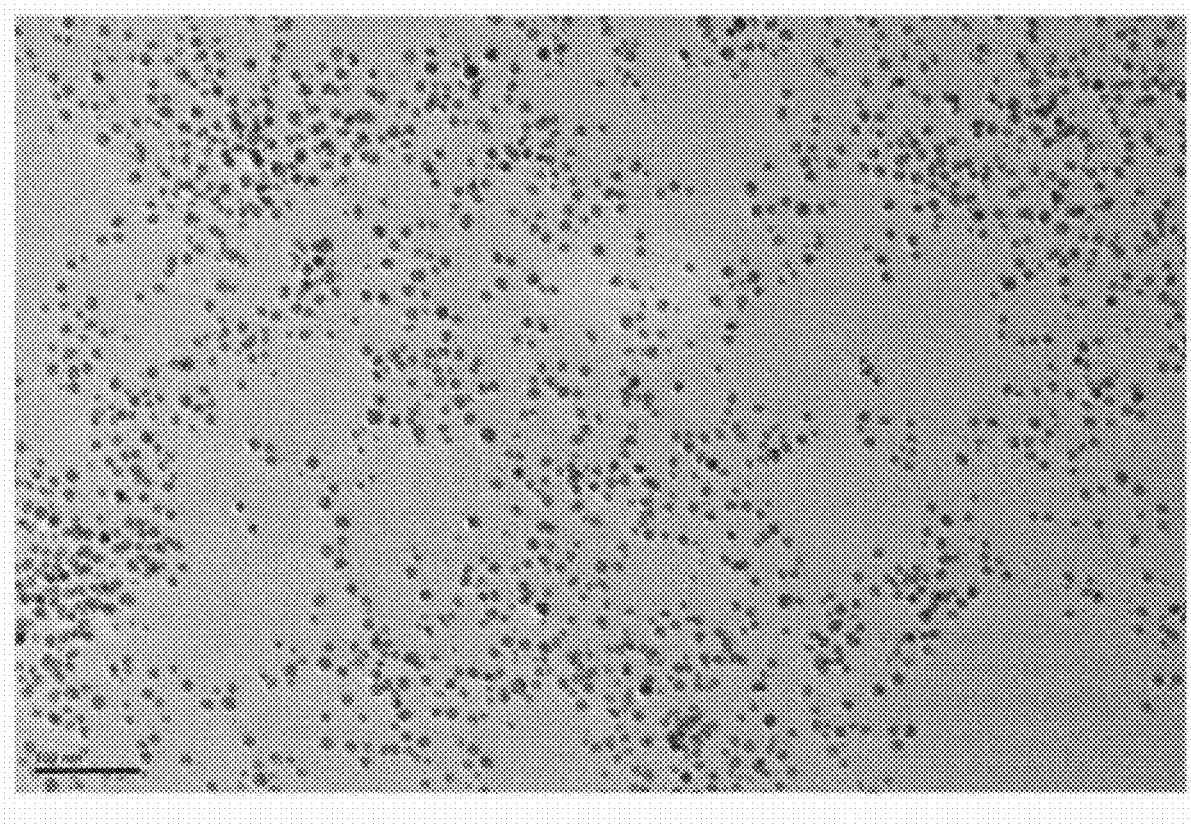
FIG. 1 shows a transmission electron micrograph of nanosilver as prepared according to Example 1 of the present invention.
Figure 2:
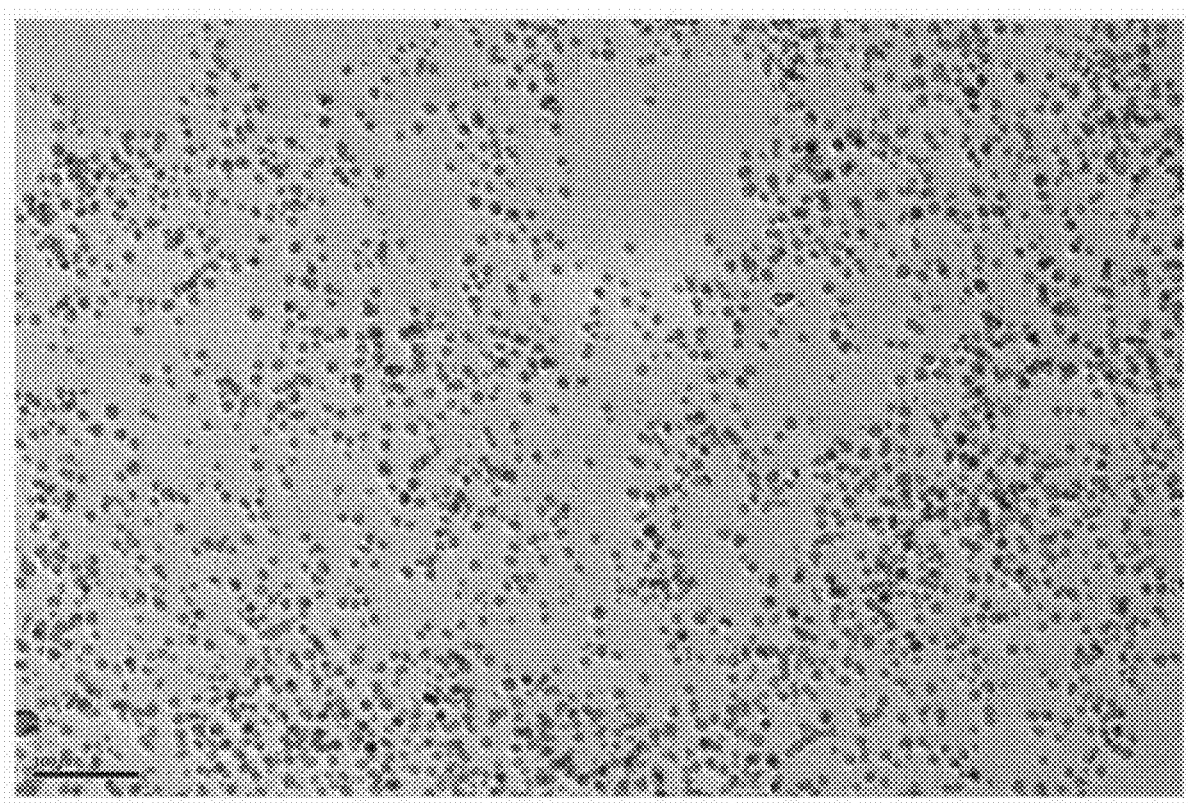
FIG. 2 shows a transmission electron micrograph of nanosilver as prepared according to Example 2 of the present invention.
Figure 3:
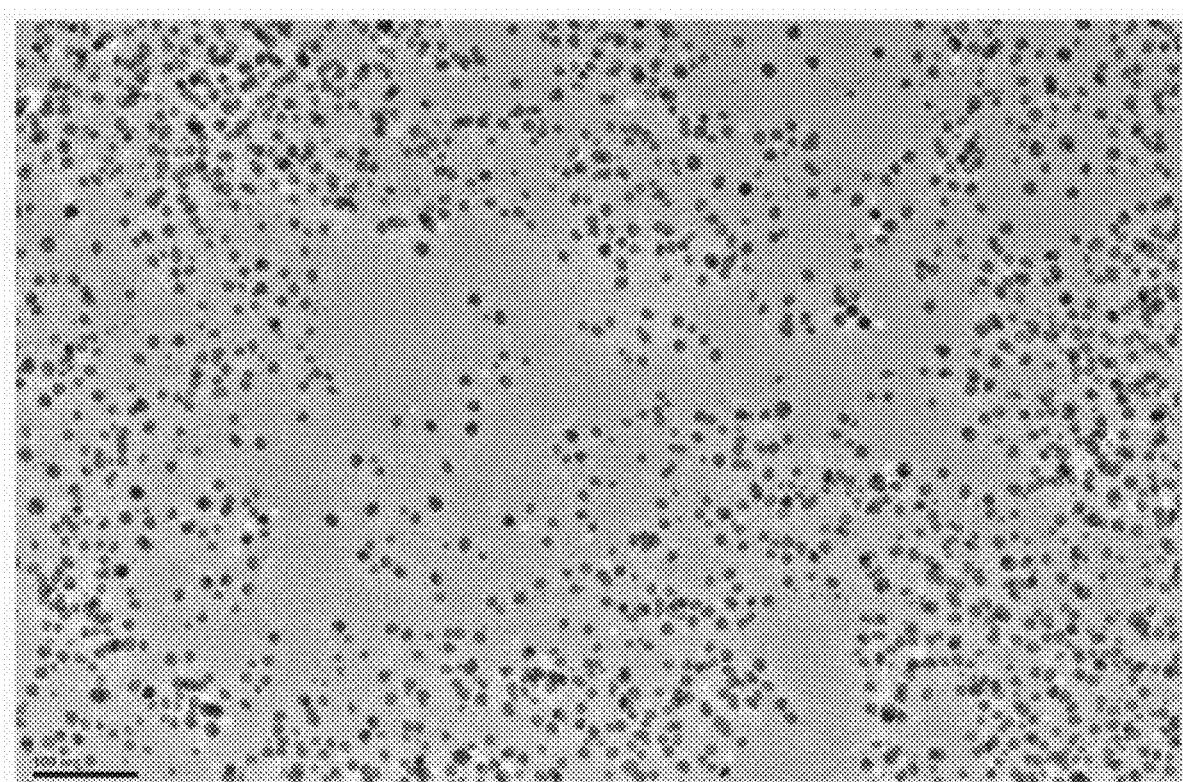
FIG. 3 shows a transmission electron micrograph of nanosilver as prepared according to Example 3 of the present invention.

The present invention provides a process for preparing nano-metal particles, the process comprising the steps of: a) providing a solution of a metal precursor in a first solvent at a first temperature; b) providing a solution of a reducing agent in a second solvent containing a polymeric protective agent at a second temperature as a mother liquor; c) atomizing the solution of the metal precursor and contacting the atomized metal precursor solution with the mother liquor; and d) allowing the metal precursor to react with the reducing agent to form the nano-metal particles, wherein the metal precursor has a higher solubility in the first solvent at the first temperature than in the mother liquor at the second temperature.

In the present invention, the process for preparing the nano-metal particles includes the step of providing a solution of the metal precursor in the first solvent at a first temperature (hereinafter simply referred to as step a).

In an embodiment of the invention, step a) may include dissolving the metal precursor in the first solvent at a first temperature to form a solution of the metal precursor in the first solvent. The first solvent may be stirred if necessary.

As stated previously in the definitions section, "metal precursor" is understood herein as a compound capable of obtaining a target metal via a reduction step by liquid phase chemical reduction. The process of the present invention may adopt any metal precursor suitable for liquid chemical reduction method known to those skilled in the art. Preferably, a metal precursor the standard electrode potential of which metal is more than −1.0 V, more preferably more than 0 V, may be used. The metal precursor comprises an inorganic or organic metal salt that is soluble in water or an aqueous solvent. Suitably, the metal salt may comprise one or more of the following metals: Pt, Pd, Ru, Rh, Re, Ir, Os, Fe, Co, Ni, Cu, Ag, Au, Cd, In, Ga, Sn, Pb, Bi, Sb, Ti, Zr, Cr, Mo, W, V, Nb and Mn.

In one embodiment of the present invention, a soluble salt, preferably a water-soluble salt of Pt, Pd, Ru, Rh, Re, Cu, Au, Re, Ir, Os, Ni or Ag, can be used, as the metal precursor. Suitable Pt salts comprise $Pt(NO_3)_2$, $(NH_3)_4Pt(NO_3)_2$, $H_2PtCl_6$, $K_2PtCl_4$, $(NH_3)_4Pt(OH)_2$ and $Cl_4Pt(NH_3)_2$. Suitable Ag and Cu salts comprise $AgNO_3$, $AgCH_3COO$, $Cu(NO_3)_2$, $Cu(CH_3COO)_2$ and Cu (II) acetylacetonate. Suitable Pd salts comprise $Pd(NH_3)_4(NO_3)_2$ and $Pd(NO_3)_2$. Suitable Ni salts comprise $NiCl_2$ and $Ni(NO_3)_2$. Suitable Au salts include $AuCl_2$. In a specific embodiment of the invention, silver nitrate ($AgNO_3$) is used as the metal precursor.

The metal precursors are readily available to one skilled in the art. For example, the metal precursor may be commercially available in the form of a metal salt that is soluble in the first solvent or in the form of a solution of the metal salt in the first solvent. For example, nitrates commercially available from Sigma Aldrich can be used. Alternatively, the metal precursor may be synthesized by a method known in the art. For example, silver nitrate precursors can be prepared by using silver hydroxide Ag(OH) as a starting material and then reacting silver hydroxide with nitric acid to form the desired silver nitrate precursor.

In step a), any liquid with sufficient purity where a metal precursor is suitable for dissolving therein may be used as the first solvent. Such solvents include, but are not limited to, water, alcohols and other organic solvents. Preferably, water or secondary deionized water is used.

Depending on the type of metal precursor and first solvent used and the desired solubility of the metal precursor in the first solvent, a suitable first temperature may be determined. In some embodiments, the first temperature is a temperature between 60° C. and 90° C.

Preferably, the concentration of the metal precursor in the first solvent is 75% to 100%, more preferably 90% to 100% of its saturation concentration at the first temperature.

In the present invention, the process for producing the nano-metal particles comprises the step of providing a solution of a reducing agent in a second solvent containing a polymeric protective agent at a second temperature as a mother liquor (hereinafter abbreviated as step b).

According to the present invention, the reducing agent is an essential component for reducing the metal precursor. As used herein, "reducing agent" refers to any chemical agent capable of reducing a metal ion in an oxidized state to form a metal element. In the process of the present invention, reducing agents having different reducibility may be used. For example, in order to obtain nano-sized metal particles with a smaller particle diameter, a more reducible tannic acid reducing agent can be used. The tannic acid reducing agent causes the metal ions to be rapidly reduced, nucleated and crystallized, so that nano-sized metal particles with a smaller particle size can be formed. In contrast, the reducing agent glucose aldehyde has weaker reducibility, its metal ion reduction rate is relatively slow, the metal particles after nucleation will grow at a slower speed for a longer time, and thus can form metal particles having a relatively large particle size. In embodiments of the present invention, the reducing agents used include, but are not limited to, tannic acid, gluconic acid, hydrazine hydrate, alkali metal borohydrides, alkali metal hypophosphites, alkali metal citrates, ascorbic acid or others reducing agent suitable for reducing metal ions known to those skilled in the art. Preferably, as the reducing agent, tannic acid or gluconic acid may be used, depending on the desired size of the nano-sized metal particles.

According to the present invention, a polymeric protective agent is also required. As the name implies, the polymeric protective agent refer to any macromolecule (or polymer) that are capable of stabilizing the reaction system during the preparation of metal nanoparticles. Examples of the polymer protective agent include a water-soluble polymer or a hydrophilic polymer. In an embodiment of the present invention, the polymeric protective agent includes but is not limited to polyvinylpyrrolidone, cellulose, polyvinyl alcohol, gum, polyethylene glycol, biogels, sodium alginate, agar, Hyaluronic acid, modified starch, poly(meth)acrylamide resins, poly(meth)acrylic resins, polymaleic anhydride, and quaternary ammonium polymers. Preferably, polyvinylpyrrolidone can be used as the polymer protective agent. The amount of the polymer protective agent can be determined experimentally by those skilled in the art according to actual demands.

In one embodiment, a second solvent is provided which contains a polymeric protective agent. The polymeric protective agent, which is usually in powder form, may be dissolved in the second solvent. Dissolution is usually carried out at ambient or room temperature, for example a temperature of 15° C. to 30° C. If needed, the temperature can be adjusted. Then, a reducing agent is dissolved in a certain amount of the second solvent. The second solvent may be stirred during dissolution. Dissolution is usually carried out at ambient or room temperature, for example a temperature of 15° C. to 30° C. Next, a solution of the polymeric protective agent in the second solvent and a solution of the reducing agent in the second solvent are mixed to form a mother liquor. During mixing, the temperature of the mother liquor may be adjusted to the second temperature and maintained at that temperature. Alternatively, the temperature of the mother liquor may be adjusted to the second temperature just prior to contacting the atomized metal precursor solution with the mother liquor, and maintained at that temperature. Depending on the type of metal precursor and second solvent used and the desired solubility of the metal precursor in the mother liquor, a suitable second temperature can be determined. In some embodiments, the second temperature is ambient or room temperature, for example a temperature of 15° C. to 30° C.

If necessary, a pH adjusting agent, a metal complexing agent, or a combination thereof may also be added to the mother liquor. Suitably, the pH adjusting agent comprises aqueous ammonia, alkali metal hydroxides, and other pH adjusting agents known to those skilled in the art. Suitably, the metal complexing agent comprises aqueous ammonia as well as other metal complexing agents known to those skilled in the art. In one embodiment of the invention, aqueous ammonia is added to the mother liquor. Aqueous ammonia not only acts as a metal complexing agent in the reaction system of the present invention, but also serves to adjust the pH of the reaction system, thereby reducing the use of reagents. This is advantageous in terms of reducing environmental pollution.

In step b), the above reducing agent, polymeric protective agent and optionally pH adjuster and/or metal complexing agent may be dissolved in the second solvent. As used herein, the second solvent refers to any liquid with sufficiently high purity which can be removed from the reaction system by evaporation, filtration, pumping, centrifuging, or other types of means. Such solvents include, but are not limited to, water, alcohols, ketones, and other solvents suitable for formulating the mother liquor known to those skilled in the art. Suitable alcohols include, but are not limited to, methanol, ethanol, ethylene glycol, or mixtures thereof. Suitable ketones include, but are not limited to, acetone, N-methylpyrrolidone, or mixtures thereof. Other suitable solvents include, but are not limited to, tetrahydrofuran, acetic acid, dimethylformamide, dimethylacetamide and mixtures thereof.

In some embodiments of the invention, the second solvent may be the same as the first solvent. For example, water or secondary deionized water may be used as the first solvent and the second solvent both. In some embodiments of the invention, the second solvent may be different from the first solvent. For example, ethanol or a mixture of water and ethanol may be used as the second solvent, and water or secondary deionized water may be used as the first solvent.

The respective addition amounts of the reducing agent, the polymeric protective agent, the optional pH adjusting agent, and the optional metal complexing agent in the mother liquid should ensure that the respective intended effects thereof can be realized. A person skilled in the art can experimentally determine their respective suitable amounts depending on the particular type of reducing agent, polymeric protecting agent, optional pH adjuster, and optional metal complexing agent. In one embodiment, the concentration of the reducing agent in the mother liquor is from 1.0% by weight to 5.0% by weight, preferably from 1.0% by weight to 3.0% by weight. In one embodiment, the concentration of the polymeric protective agent in the mother liquor is 0.8% by weight to 5.0% by weight, preferably 1.0% by weight to 2.0% by weight. In one embodiment, the concentration of the pH adjusting agent in the mother liquor is from 0.2% by weight to 0.5% by weight, alternatively, the pH adjusting agent is used in an amount sufficient to adjust the pH of the mother liquor in the range of from 6 to 9, preferably from 6.5 to 7.5. In one embodiment, the concentration of the metal complexing agent in the mother liquor is from 0.2% by weight to 0.5% by weight, alternatively, the amount of the metal complexing agent to the metal precursor is from 1:5 to 1:100 on a molar basis, preferably 1:5 to 1:50.

According to the present invention, the process for preparing the nano-metal particles further comprises atomizing the solution of the metal precursor and contacting the atomized metal precursor solution with the mother solution (hereinafter referred to as step c).

In step c), atomization of the metal precursor solution can be performed in a manner known in the art. In the art, atomization is usually achieved with an atomizing nozzle. According to the process of the present invention, atomization can be achieved using a two-fluid nozzle, an ultrasonic nozzle, or other conventional nozzles suitable for the present invention, preferably with a two-fluid nozzle. A "two-fluid nozzle" is a nozzle device that carries out atomization using two fluids. In general, the two-fluid nozzle atomize a liquid fluid with a compressed gas fluid, such as an air fluid, a nitrogen fluid, and an argon fluid. For a two-fluid nozzle, atomization efficiency depends on the nozzle diameter, atomization pressure, feed rate. The nozzle diameter determines the maximum liquid flow rate. At a given nozzle diameter, the higher the atomization pressure and the faster the feed rate, the higher the atomization efficiency is. Atomization may be accomplished in a very short period, such as less than 10 minutes, less than 8 minutes, less than 6 minutes, less than 4 minutes, less than 3 minutes, less than 2 minutes, less than 1 minute, less than 30 seconds, or less.

Without being bound by any theory, it is believed that atomization causes the metal precursor solution to form micro-droplets, so that the effective contact area between the metal precursor and the mother liquor is drastically increased and thus the metal precursor may be more evenly distributed in the mother liquor.

In one embodiment of the invention, the metal precursor is atomized with nitrogen fluid under conventional spray conditions, for example with a nozzle inner diameter (i.e. the diameter of the nozzle) of 1.2 mm at an atomization pressure of 5 bar and a feed rate of 5 ml/min. The atomization process is completed in less than 4 minutes.

In step c), the atomized metal precursor solution comes into contact with the mother liquor at a second temperature. Upon contact, since the solubility of the metal precursor in the first solvent used to form the solution is higher than that in the mother solution in which the reduction reaction occurs, the metal precursor has a decreased solubility and thus a large amount of solid crystallites of the metal precursor are precipitated in the mother liquid.

In some embodiments of the invention, the difference in solubility of the metal precursor is achieve in such a way that the first solvent used for the metal precursor solution is the same as the second solvent used for the mother liquid, but the first temperature of the metal precursor solution is higher than the second temperature of the mother liquor. Preferably, the first temperature is higher than the second temperature of the mother liquor by 40° C. or higher, preferably by 60° C. or higher.

In one embodiment for preparing nano-silver particles from silver nitrate, water is used as the first solvent and the second solvent, the first temperature of the silver nitrate aqueous solution is higher than the second temperature of the mother liquid. For example, the first temperature of the silver nitrate solution is about 80° C., and the second temperature of the mother liquor is about 20° C. The solubility of silver nitrate in water at 80° C. is much higher than its solubility in water at 20° C. In step c), the silver nitrate solution at high temperature is atomized into tiny droplets. The atomized droplets can stay briefly in the air. If the air temperature is significantly lower than the temperature of the silver nitrate solution, the temperature of the atomized droplets will decrease, thereby allowing silver nitrate crystallites to precipitate. Thus, atomized silver nitrate solution droplets can be tiny droplets containing a small amount of silver nitrate solid nuclei or crystallites. When the atomized silver nitrate solution is brought into contact with the mother liquor, the temperature of the drop rapidly drops to about 20° C., which significant temperature difference causes further precipitation of the solid silver nitrate to form a large amount of silver nitrate crystallites.

In other embodiments of the invention, the difference in solubility of the metal precursor is achieved in such a way that the first temperature of the metal precursor solution is about the same or substantially the same as the second temperature of the mother liquor, and the first solvent for forming the metal precursor solution is different from the second solvent used to form the mother liquor, wherein the first solvent is a good solvent for the metal precursor and the second solvent is a poor solvent for the metal precursor.

In one embodiment of preparing silver nanoparticles from silver nitrate, the first solvent used may be deionized water and the second solvent may be a mixture of methanol: deionized water in a weight ratio of 1:1 wherein the solubility of the silver nitrate in deionized water is higher than its solubility in a mixture of methanol and deionized water at a weight ratio of 1:1. In this example, the first temperature of the silver nitrate solution is close to or substantially the same as the second temperature of the mother liquor, preferably either ambient temperature or room temperature, for example 20° C. In step c), a solution of silver nitrate in deionized water is atomized into tiny droplets. When the atomized silver nitrate solution comes into contact with the mother liquor, the solubility of silver nitrate decreases significantly, which causes precipitation of the solid silver nitrate to form a large amount of silver nitrate crystallites.

In other embodiments of the invention, the difference in solubility of the metal precursor is generated in such a way that the first temperature of the metal precursor solution is higher than the second temperature of the mother liquor, and the first solvent for the metal precursor solution is different from the second solvent for the mother liquor, wherein the first solvent is a good solvent for the metal precursor and the second solvent is a poor solvent for the metal precursor. Preferably, the temperature of the metal precursor solution is 40° C. or more, preferably 60° C. or more, higher than the temperature of the mother liquor.

In one embodiment of preparing silver nanoparticles from silver nitrate, the first solvent used may be deionized water, the second solvent may be a mixture of methanol:deionized water in a weight ratio of 1:1, and the first temperature of silver nitrate solution is about 80° C. and the second temperature of the mother liquor is about 20° C. In step c), the solution of silver nitrate in deionized water at high temperature is atomized into tiny droplets. The atomized droplets can stay briefly in the air. If the temperature of the air is significantly lower than the temperature of the silver nitrate solution, the temperature of the atomized droplets will decrease, allowing silver nitrate crystallites to precipitate. Thus, atomized silver nitrate solution droplets can be tiny droplets containing a small amount of silver nitrate solid nuclei or crystallites. When the atomized silver nitrate solution comes into contact with the mother liquor, the temperature of the droplets rapidly decreases to about 20° C., which significant temperature difference in combination with the presence of poor solvent methanol leads to the further precipitation of the solid silver nitrate to form a large amount of silver nitrate crystallites.

Preferably, when the atomized silver nitrate solution is brought into contact with the mother liquor, the mother liquor is stirred. As a result, the precipitated metal precursor crystallites are rapidly and uniformly dispersed in the mother liquor.

In step c), the metal precursor may be dispersed in the mother liquor in a very short period, such as less than 4 minutes, less than 3 minutes, less than 2 minutes, less than 1 minute, less than 30 seconds, or less. Throughout the dispersion process, the metal precursor is precipitated as a solid, and thus the reaction between the metal precursor present and the reducing agent in the liquid phase is negligible, so the amount of reducing agent consumed is small.

In the present invention, the process for producing the nano-metal particles further includes a step of allowing the metal precursor to react with the reducing agent to form the nano-metal particles (hereinafter simply referred to as step d).

According to the present invention, the precipitated metal precursor crystallites are sufficiently dispersed in the mother liquor and a dynamic solid-liquid phase change process via dissolution-precipitation can be established. The dissolved metal precursor reacts with the reducing agent in the liquid phase, and the resulting metal element undergoes nucleation and crystal growth to obtain the nano-metal particles. In the process of the present invention, the nucleation of the nano-metal particles grown at different regions of the liquid phase reaction system occurs at the substantially same time; during the growth phase, different crystal particles has the substantially same growth rate at the same time since the metal element has the substantially same production rate throughout the liquid phase reaction system because of the substantially same concentration of the reducing agent. Since the nano-metal particles prepared by the process of the present invention have substantially the same nucleation time and the crystal growth rate as each other, it is possible to provide the nano-metal particles having a desired particle size while having a very narrow particle size distribution width. It is particularly advantageous, according to the present invention, to provide substantially monodispersed nano-metal particles. For example, with the process of the present invention described above, nano-metal particles having a particle size of less than or equal to 20 nm and having a particle size distribution width of less than or equal to 0.1 can be formed, the particle size is measured by DLS or transmission electron microscopy image analysis and the particle size distribution is measured by DLS or transmission electron microscopy image analysis. Such nano-metal particles with smaller particle size and narrow particle size distribution width have unique properties such as small size effect, surface effect, quantum effect, conductive effect, catalytic effect and the like.

These nano-metal particles may be nano-metal particles of a type known in the art. In an embodiment of the invention, the metal of the metal nanoparticle is a metal having a standard electrode potential of greater than −1.0V, more preferably greater than 0V. Metals that can be used include Pt, Pd, Ru, Rh, Re, Ir, Os, Fe, Co, Ni, Cu, Ag, Au, Cd, In, Ga, Sn, Pb, Bi, Sb, Ti, Zr, Cr, Mo, W, V, Nb or Mn, preferably including noble metals such as gold, silver, platinum and palladium, nickel, cobalt, copper, iron and the like. In some embodiments of the invention, the metal is selected from the group consisting of silver, gold, platinum, and nickel.

In the context of the present invention, "particle size" is understood to mean the diameter of the spherical particles in the case of nano-particles of metal; or the sphere equivalent diameter in the case that the nano-particles of metal are non-spherical particles for example including but not limited to rod particles and disc-shaped particles. In general, methods for determining the particle size include optical microscopy, scanning microscopy and atomic force microscopy (AFM). If microscopy is used, the size of 100 randomly selected particles is determined and averaged. According to the invention, the particle size is determined by DLS or transmission electron microscopy image analysis. In an embodiment of the invention, the nano-metal particles prepared by the process of the invention have a particle size of less than or equal to 20 nm, preferably less than or equal to 10 nm.

It is well-known that the particle size distribution width is an indicator of particle size distribution. In the present invention, the particle size distribution width is defined as the ratio of the average particle size to the D50 particle diameter (i.e., the equivalent diameter of the largest particle at a cumulative distribution of 50% in the distribution curve), the ratio of s/D50. In the art, particles having a size distribution width of less than 0.05 may be considered as having a very narrow particle distribution; particles having a size distribution width of between 0.05 and 0.2 may be considered as having a narrow particle distribution; particles having a size distribution width of between 0.2 and 0.4 may be considered as having a modest particle distribution; particles having a size distribution width of between 0.4 and 0.6 may be considered as having a broad particle distribution; and particles having a size distribution width of between 0.4 and 0.6 may be considered as having a very broad particle distribution. According to the invention, the particle size distribution width is determined by dynamic light scattering or transmission electron microscopy image analysis. In an embodiment of the present invention, the nano-metal particles prepared by the process of the present invention have a size distribution width of less than or equal to 0.1.

In an embodiment of the present invention, examples of the prepared nano-metal particles include, being not limited to, nano-silver particles, nano-gold particles, nano-platinum particles, or nano-nickel particles. These nano-metal particles have a particle size of less than or equal to 20 nm and a particle size distribution width of less than or equal to 0.1, preferably having a particle size between 1 nm and 10 nm and a particle size distribution width of less than or equal to 0.1, wherein the particle size is determined by DLS or transmission electron microscopy image statistical analysis, and the particle size distribution width is determined by DLS or transmission electron microscopy image analysis.

In addition, the inventors further surprisingly found that with the process of the present invention, the entire preparative reaction can be completed in a very short period. In one embodiment of preparing silver nanoparticles from silver nitrate, the reaction is completed in a period of 30 minutes or less, which is much less than the reaction time of conventional liquid phase chemical reduction. It is well-known that the preparation of nano-silver particles by conventional liquid-phase chemical reduction usually takes several hours, for example 4 hours or more.

In another aspect, the present invention provides nano-metal particles having a particle size of less than or equal to 20 nm and a particle size distribution width of less than or equal to 0.1, wherein the particle size is determined by DLS or transmission electron microscopy image statistical analysis, and the particle size distribution width is determined by DLS or transmission electron microscopy image analysis.

In an embodiment of the invention, the metal of the nano-metal particles has a standard electrode potential of greater than −1.0 V, preferably greater than 0V. Preferably, the metal is one or more selected from the group consisting of Pt, Pd, Ru, Rh, Re, Ir, Os, Fe, Co, Ni, Cu, Ag, Au, Cd, In, Ga, Sn, Pb, Bi, Sb, Ti, Zr, Cr, Mo, W, V, Nb and Mn.

The nano-metal particles according to the present invention can be obtained by the preparation method of the nano-metal particles according to the present invention.

Some additional non-limiting embodiments of the present invention are provided below to further illustrate certain aspects of the invention.

1. A process for producing nano-metal particles, the method comprising the steps of:
   a) providing a solution of a metal precursor in a first solvent at a first temperature;
   b) providing a solution of a reducing agent in a second solvent containing a polymeric protective agent at a second temperature as a mother liquor;
   c) atomizing the solution of the metal precursor and contacting the atomized metal precursor solution with the mother liquor; and
   d) allowing the metal precursor to react with the reducing agent to form the nano-metal particles,
   wherein the metal precursor has a higher solubility in the first solvent at the first temperature than in the mother liquor at the second temperature.

2. The process of embodiment 1 further comprising, agitating the resulting mixture when the mother liquor comes into contact with the atomized metal precursor solution.

3. The process of embodiment 1 or 2, wherein the formed nano-metal particles have a particle size of less than or equal to 20 nm and a particle size distribution width of less than or equal to 0.1 the particle size as measured by DLS or transmission electron microscopy image statistics Analytical determination, the particle size distribution width as determined by DLS or transmission electron microscopy image analysis.

4. The process of embodiment 1 or 2, wherein the first temperature of the solution of the metal precursor is higher than the second temperature of the mother liquor.

5. The process of embodiment 1 or 4, wherein the first solvent and the second solvent are different.

6. The process of embodiment 4, wherein the first solvent and the second solvent are the same.

7. The process of embodiment 1 or 2, wherein the first solvent is water.

8. The process of embodiment 1 or 2, wherein the second solvent is selected from the group consisting of water, alcohols, ketones, and combinations thereof.

9. The process of embodiment 1 or 2, wherein atomizing the solution of the metal precursor is achieved by two-fluid spraying or ultrasonic spraying.

10. The process of embodiment 1 or 2, wherein the reaction is completed in a period of 30 minutes or less.

11. The process of embodiment 1 or 2, wherein the metal of the nano-metal particles has a standard electrode potential of greater than −1.0 V, preferably greater than 0 V.

12. The process of embodiment 11, wherein the metal is selected from one or more of the following metals: Pt, Pd, Ru, Rh, Re, Ir, Os, Fe, Co, Ni, Cu, Ag Au, Cd, In, Ga, Sn, Pb, Bi, Sb, Ti, Zr, Cr, Mo, W, V, Nb and Mn.

13. The process of embodiment 1 or 2, wherein the reducing agent is selected from the group consisting of tannic acid, glucose acid, hydrazine hydrate, alkali metal borohydride, alkali metal hypophosphites, alkali metal citrates and ascorbic acid.

14. The process of embodiment 1 or 2, wherein the polymeric protective agent comprises a water-soluble polymer or a hydrophilic polymer.

15. The process of embodiment 14, wherein the polymeric protective agent is selected from the group consisting of polyvinylpyrrolidone, cellulose, polyvinyl alcohol, gums, polyethylene glycols, biogels, sodium alginate, agar, hyaluronic acid, modified starch, poly(meth)acrylamide resins, poly(meth)acrylic resins, polymaleic anhydride, and quaternary ammonium polymers.

16. The process of embodiment 1 or 2, wherein the mother liquor further comprises a pH adjusting agent, a metal complexing agent, or a combination thereof.

17. The process of embodiment 1, wherein the first temperature is a temperature between 60° C. and 90° C. and/or the second temperature is a temperature between 10° C. and 50° C.

18. The process of embodiment 1, wherein the metal precursor has a solubility in the first solvent at the first temperature that is 50%-200% higher, preferably 100% to 200% higher than the solubility in the mother liquor at the second temperature.

19. The nano-metal particles obtained by the process according to any one of the embodiments 1 to 18.

20. A nano-metal particle having a particle size of less than or equal to 20 nm and a particle size distribution width of less than or equal to 0.1, the particle size as determined by DLS or transmission electron microscopy image analysis, and the distribution width as determined by DLS or transmission electron microscopy image analysis.

EXAMPLE

Test Methods:

Particle Diameter and Particle Size Distribution Width: The particle size and particle size distribution width of the nano-metal particles according to the present invention can be determined by the following two test methods.

Electron microscopy image analysis: The prepared nanoparticles was dispersed in water, and then diluted with anhydrous ethanol to have a concentration of 1000 ppm or less. Then a small amount of the diluted dispersion was pipetted and added dropwise on the copper net. The dried samples were placed in TEM and 10 electron micrographs were taken randomly in different regions. The obtained electron micrographs were analyzed by image analysis software (ImageJ) to obtain the particle size and particle size distribution width.

Dynamic Light Scattering Method: The nanoparticles as prepared by the reaction were dispersed in water and formulated to a nanoparticle dispersion in 5 mg/ml. The formulated dispersion was placed in Nanophox (NXi001) for particle size and distribution analysis.

Antibacterial effect: The antibacterial effect of the nano-metal particles according to the present invention was determined by Disinfection Technical Specifications, MS(i) C029-001-FM03, MOH of China, 2002.

Example 1

Step A: Preparation of Silver Nitrate Solution 585 g of silver nitrate (available from Sigma Aldrich) was dissolved in 100 g of deionized water at 80° C. to make a saturated silver nitrate solution, to which additional silver nitrate was added to keep it saturated. The saturated solution was then rinsed with nitrogen for 10 minutes, and additional water was added to compensate for the water lost during the rinsing process. Then, the solution was left to ensure that undissolved silver nitrate crystals settled and the solution was kept at 80 C.

Step B: Preparation of Mother Liquor 23 g of PVP (K30 from Sigma Aldrich) was dissolved in 1 kg of deionized water, 34 g of tannic acid (available from Sigma Aldrich) was dissolved in 1 kg of deionized water, and 25.5 g of aqueous ammonia (with a concentration of 28 wt %, available from Sigma Aldrich) was dissolved in 1 kg of deionized water and the above three solutions were mixed into a 20 L vessel equipped with an overhead stirrer, followed by addition of 5.5 kg of deionized water to form a clear yellow solution (hereinafter referred to as mother liquor). The mother liquor was continuously stirred with an upper stirrer at 60 rpm and the temperature of the mother liquor was kept at 20° C. The mother liquor was rinsing with nitrogen for 5 minutes at a flow rate of 5 L/min for 20 minutes.

Step C: Preparation of Nano Silver Particles 80 grams of the saturated silver nitrate solution prepared in Step A was fed to a two-fluid nozzle with ID 1.2 mm using a peristaltic pump at 5 ml/min and then atomized through a two-fluid nozzle under 5 bar nitrogen and sparged into the mother liquor. During sparging, the mother liquor was stirred at 250 rpm. For the silver nitrate solution, the spray pattern remained to be a taper, and the average haze size remained about 100 nm. The entire atomization lasted 4 minutes. During the entire spray addition, the silver nitrate solution was maintained at 80° C. and the mother liquor was maintained at 20° C. After the addition was completed, the stirring speed was reduced to 60 rpm. After that, the reaction was continued for 30 minutes while stirring to ensure the reaction was completed.

After the reaction, the dark red colloidal suspension of silver nanoparticles was added to a vacuum assisted distillation vessel to concentrate the suspension, and the concentrated suspension was then subjected to solid-liquid separation by filtration. The solid is washed several times with deionized water until the conductivity of the washing liquid was less than 5 μS/cm. The resulting solid was then dried at 40° C. overnight to obtain a fine powder of nano-silver particles. The yield was 92.3% and the purity was 99.3%.

TEM analysis showed that very uniform nanoparticles were obtained without any agglomeration. The average particle size was about 8.6 nm and the particle size distribution width was as low as 0.1.

Example 2

Step A: Preparation of Silver Nitrate Solution 222 g of silver nitrate (available from Sigma Aldrich) was dissolved in 100 g of deionized water at 20° C. to make a saturated silver nitrate solution, to which additional silver nitrate was added to keep it saturated. The saturated solution was then rinsed with nitrogen for 10 minutes, and additional water was added to compensate for the water lost during the rinsing process. The solution was then left standing to ensure that undissolved silver nitrate crystals settled and the solution was kept at 80° C.

Step B: Preparation of Mother Liquor 23 g of PVP (K30 from Sigma Aldrich) was dissolved in 1 kg of deionized water, 34 g of tannic acid (purchased from Sigma Aldrich) was dissolved in 1 kg of deionized water, 25.5 g of aqueous ammonia (with a concentration of 28 wt %, available from Sigma Aldrich) was dissolved in 1 kg of deionized water, the above solution was mixed into a 20 L vessel followed by addition of 1.25 kg of deionized water and 4.25 kg of methanol to form a clear yellow solution (hereinafter referred to as mother liquor). The mother liquor was continuously stirred with an upper stirrer at 60 rpm and the temperature of the mother liquor was maintained at 80° C. The mother liquor was rinsed with nitrogen at a flow rate of 5 L/min for 20 minutes.

Step C: Preparation of Nano Silver Particles 80 grams of the saturated silver nitrate solution prepared in Step A was fed to a two-fluid nozzle with ID 1.2 mm using a peristaltic pump at 5 ml/min and then atomized through a two-fluid nozzle under 5 bar nitrogen and sparged into the mother liquor. During sparging, the mother liquor was stirred at 250 rpm. For the silver nitrate solution, the spray pattern remained to be a taper, and the average haze size remained about 100 nm. During the entire spray addition, the silver nitrate solution was maintained at 20° C. and the mother liquor was maintained at 80° C. After the addition was completed, the stirring speed was reduced to 60 rpm. After that, the reaction was continued for 30 minutes while stirring to ensure the reaction was completed.

After the reaction, the dark red colloidal suspension of silver nanoparticles was added to a vacuum assisted distillation vessel to concentrate the suspension, and the concentrated suspension was then subjected to solid-liquid separation by filtration. The solid was washed several times with deionized water until the conductivity of the washing water was less than 5 μS/cm. The resulting solid was then dried at 40° C. overnight to obtain a fine powder of silver nanoparticles. The yield was 84.0% and the purity was 99.6%.

TEM analysis showed that very uniform nanoparticles were obtained without any agglomeration. The average particle size is about 11.4 nm and the particle size distribution width is as low as 0.1.

Example 3

Step A: Preparation of Silver Nitrate Solution 585 g of silver nitrate (available from Sigma Aldrich) was dissolved in 100 g of deionized water at 80° C. to make a saturated silver nitrate solution, to which additional silver nitrate was added to keep it saturated. The saturated solution was then rinsed with nitrogen for 10 minutes, and additional water was added to compensate for the water lost during the rinsing process. Then, the solution was left to ensure that undissolved silver nitrate crystals settled on the bottom and the solution was kept at 80 C.

Step B: Preparation of Mother Liquor 23 g of PVP (K30 from Sigma Aldrich) was dissolved in 1 kg of deionized water, 34 g of tannic acid (available from Sigma Aldrich) was dissolved in 1 kg of deionized water, 25.5 g of aqueous ammonia (with a concentration of 28 wt %, available from Sigma Aldrich) was dissolved in 1 kg of deionized water and the above three solutions were mixed into a 20 L vessel equipped with an overhead stirrer, followed by addition of 1.25 kg of deionized water and 4.25 kg of Methanol to form a clear yellow solution (hereinafter referred to as mother liquor). The mother liquor was continuously stirred with an upper stirrer at 60 rpm and the temperature of the mother liquor was kept at 20° C. The mother liquor was rinsed with nitrogen at a flow rate of 5 L/min for 20 minutes.

Step C: Preparation of Nano Silver Particles

After rinsing, 80 grams of the saturated silver nitrate solution prepared in Step A was fed to a two-fluid nozzle with ID 1.2 mm using a peristaltic pump at 5 ml/min and then atomized through a two-fluid nozzle under 5 bar nitrogen and sparged into the mother liquor. During sparging, the mother liquor was stirred at 250 rpm. For the silver nitrate solution, the spray pattern remained to be a taper, and the average haze size remained about 100 nm. The entire atomization lasted 4 minutes. During the entire spray addition, the silver nitrate solution was maintained at 80° C. and the mother liquor was maintained at 20° C. After the addition was completed, the stirring speed was reduced to 60 rpm. After that, the reaction was continued for 30 minutes while stirring to ensure the reaction was completed.

After the reaction, the dark red colloidal suspension of silver nanoparticles was added to a vacuum assisted distillation vessel to concentrate the suspension, and the concentrated suspension was then subjected to solid-liquid separation by filtration. The solid was washed several times with deionized water until the conductivity of the washing water was less than 5 µS/cm. The resulting solid was then dried at 40° C. overnight to obtain a fine powder of silver nanoparticles. The yield was 89.1% and the purity was 99.5%.

TEM analysis showed that very uniform nanoparticles were obtained without any agglomeration. The average particle size is about 10.2 nm and the particle size distribution width is as low as 0.1.

Comparative Example A

The above example 1 was repeated, except that the silver nitrate solution was added dropwise to the mother liquor. The reaction time is up to 4 hours.

TEM analysis showed that a large number of agglomerated, deformed microparticles were obtained.

Comparative Example B

The above Example 1 was repeated except that the temperatures of the silver nitrate solution and the mother liquor were the same without any solubility difference. The reaction time is 30 minutes.

TEM analysis showed that a large number of agglomerated, deformed microparticles were obtained.

Table 1 below summarizes the results of the nano-silver particles prepared in Examples 1-3 and Comparative Examples 1-2 above.

|  | Ex1 | Com ExA | Com ExB | Ex2 | Ex3 |
| --- | --- | --- | --- | --- | --- |
| Particle size | 8.6 nm | 580 nm | 220 nm | 11.4 | 10.2 |
| Distribution | 0.1 | 0.576 | 0.412 | 0.1 | 0.1 |
| Yield | 92.3 | 67.7 | 78.8 | 84.0 | 89.1 |
| Purity | 99.3 | 99.2 | 99.3 | 99.6 | 99.5 |
| Reaction time | 30 min | 4 h | 30 min | 30 min | 30 min |

From the above results, it can be seen that the nano-metal particles prepared by the process of the present invention have a smaller particle size and a narrower particle size distribution width. In addition, this process can be completed in a very short period.

Antibacterial Experiment

According to the Disinfection Technical Specifications, MS(i)C029-001-FM03, MOH of China, 2002, the nanosilver particles prepared in Example 2 above were tested for antibacterial activity. The antibacterial effect (minimum inhibitory concentration, MIC) and bactericidal effect (minimum bactericidal concentration, MBC) of the nano-silver particles against different strains were summarized in Table 2 below:

TABLE 2

|  | MIC, mg/kg | MBC, mg/kg |
| --- | --- | --- |
| Escherichia coli | 1.28 | 3.20 |
| Candida albicans | 0.96 | 1.28 |
| Resistant Staphylococcus aureus | 3.20 | 6.40 |
| Staphylococcus aureus | 1.28 | 3.20 |

Thus, the nano-silver particles prepared by the process of the present invention have excellent antibacterial effect.

What is claimed is:

1. A process for producing nano-metal particles, the method comprising the steps of:
   a) providing a solution of a metal precursor in a first solvent at a first temperature;
   b) providing a solution of a reducing agent in a second solvent containing a polymeric protective agent at a second temperature as a mother liquor;
   c) atomizing the solution of the metal precursor and contacting the atomized metal precursor solution with the mother liquor; and
   d) allowing the metal precursor to react with the reducing agent to form the nano-metal particles,
   wherein the metal precursor has a higher solubility in the first solvent at the first temperature than in the mother liquor at the second temperature; and
   wherein the metal precursor has a solubility in the first solvent at the first temperature that is 50%-200% higher than the solubility in the mother liquor at the second temperature.

2. The process of claim 1 further comprising, agitating the resulting mixture when the mother liquor comes into contact with the atomized metal precursor solution.

3. The process of claim 1, wherein the formed nano-metal particles have a particle size of less than or equal to 20 nm and a particle size distribution width of less than or equal to 0.1 the particle size as measured by Dynamic Light Scattering or transmission electron microscopy image statistics Analytical determination, the particle size distribution width as determined by DLS or transmission electron microscopy image analysis.

4. The process of claim 1, wherein the first solvent is water.

5. The process of claim 1, wherein the second solvent is selected from the group consisting of water, alcohols, ketones, and combinations thereof.

6. The process of claim 1, wherein the step d) is completed in a period of 30 minutes or less.

7. The process of claim 1, wherein the metal of the nano-metal particles has a standard electrode potential of greater than −1.0 V.

8. The process of claim 7, wherein the metal is selected from one or more of the following metals: Pt, Pd, Ru, Rh, Re, Ir, Os, Fe, Co, Ni, Cu, Ag Au, Cd, In, Ga, Sn, Pb, Bi, Sb, Ti, Zr, Cr, Mo, W, V, Nb and Mn.

9. The process of claim 1, wherein the reducing agent is selected from the group consisting of tannic acid, glucose acid, hydrazine hydrate, alkali metal borohydride, alkali metal hypophosphites, alkali metal citrates and ascorbic acid.

10. The process of claim 1, wherein the first temperature of the solution of the metal precursor is higher than the second temperature of the mother liquor.

11. The process of claim 10, wherein the first solvent and the second solvent are the same.

12. The process of claim 1, wherein the first solvent and the second solvent are different.

13. The process of claim 1, wherein atomizing the solution of the metal precursor is achieved by two-fluid spraying or ultrasonic spraying.

14. The process of claim 1, wherein the polymeric protective agent comprises a water-soluble polymer or a hydrophilic polymer.

15. The process of claim 14, wherein the polymeric protective agent is selected from the group consisting of polyvinylpyrrolidone, cellulose, polyvinyl alcohol, gums, polyethylene glycols, biogels, sodium alginate, agar, hyaluronic acid, modified starch, poly(meth)acrylamide resins, poly(meth)acrylic resins, polymaleic anhydride, and quaternary ammonium polymers.

16. The process of claim 1, wherein the mother liquor further comprises a pH adjusting agent, a metal complexing agent, or a combination thereof.

17. The process of claim 1, wherein the first temperature is a temperature between 60° C. and 90° C. and/or the second temperature is a temperature between 10° C. and 50° C.

* * * * *